United States Patent Office 2,768,180
Patented Oct. 23, 1956

2,768,180

ENDRIN STABILIZATION USING ALKANE OXIRANE COMPOUNDS

Richard H. Bellin and John D. Marks, Denver, Colo., assignors to Shell Development Company, New York, N. Y., a corporation of Delaware No Drawing. Application July 19, 1954, Serial No. 444,386

23 Claims. (Cl. 260—348)

This invention pertains to a method for stabilizing epoxy-substituted octahydro-endo,endo-dimethanonaphthalene compounds containing halogen substituents. More particularly, the invention pertains to a method for stabilizing 6,7-epoxy-1,2,3,4,10,10-hexachloro-1,4,4a,5,6,-7,8,8a - octahydro - 1,4,5,8 - endo,endo-dimethanonaphthalene. The invention also pertains to the new and stable compositions which for the first time now are provided by the present invention.

Epoxy - substituted octahydro - endo,endo - dimethanonaphthalene compounds containing halogen substituents, such as 6,7-epoxy-1,2,3,4,10,10-hexachloro-1,4,4a,5,6,7,8,-8a-octahydro -1,4,5,8 - endo,endo - dimethanonaphthalene, have recently been made known and have been found to have considerable value as insecticides. Serious difficulties have been encountered in the production and use of these compounds, however, owing to their chemical instability. These difficulties have been particularly serious with 6,7-epoxy - 1,2,3,4,10,10 - hexachloro - 1,4,4a,5,6,7,8,8a - octahydro-1,4,5,8-endo,endo-dimethanonaphthalene. Like certain of their insecticidal properties, the chemical instability of these epoxy- and halogen-substituted octahydro-endo,endo-dimethanonaphthalene compounds appears to be attributable in large measure to their particular stereochemical configuration, and not merely to the nature of the substituent groups and atoms which are present. For example, under conditions where 6,7-epoxy-1,2,3,4,10,10 - hexachloro - 1,4,4a,5,6,7,8,8a - octahydro-1,4,5,8-endo,endo-dimethanonaphthalene undergoes irreversible, substantially complete conversion in but a few hours to products having little if any insecticidal activity, even as closely related a compound as 6,7-epoxy-1,2,3,-4,10,10 - hexachloro - 1,4,4a,5,6,7,8,8a - octahydro - 1,4,5,8-endo,exo-dimethanonaphthalene has been found to be substantially stable.

It is therefore one of the principal objects of this invention to provide means for overcoming the observed chemical instability of the epoxy-substituted octahydro-endo,endo-dimethanonaphthalene compounds containing halogen substituents, especially of 6,7-epoxy-1,2,3,4,10,10-hexachloro - 1,4,4a,5,6,7,8,8a - octahydro - 1,4,5,8 - endo,-endo-dimethanonaphthalene, which at the present time is the most readily available of these compounds.

Other and more specific objects of the invention will be apparent from the accompanying disclosures and claims.

The chemical compound 6,7-epoxy-1,2,3,4,10,10-hexachloro - 1,4,4a,5,6,7,8,8a - octahydro - 1,4,5,8 - endo,-endo-dimethanonaphthalene is also known as the epoxide of the Diels-Alder adduct of 1,2,3,4,7,7-hexachlorobicyclo(2.2.1)-2,5-heptadiene and cyclopentadiene. When pure it is a white crystalline material melting with decomposition at about 245° C. It can be prepared by epoxidation of this Diels-Alder adduct using, for example, peracetic acid as the epoxidizing agent. The 1,2,3,4,7,7-hexachlorobicyclo(2.2.1)-2,5-heptadiene can be prepared in turn by dehydrochlorination of the Diels-Alder adduct of hexachlorocyclopentadiene and vinyl chloride, for example, by treatment with an alcoholic solution of a caustic alkali. The chemical structure of 6,7-epoxy-1,2,3,4,10,10 - hexachloro - 1,4,4a,5,6,7,8,8a - octahydro - 1,4,5,8-endo,endo-dimethanonaphthalene can be represented in planar form by the structural formula

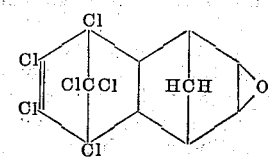

The geometrical configuration can be indicated by the following three-dimensional formula:

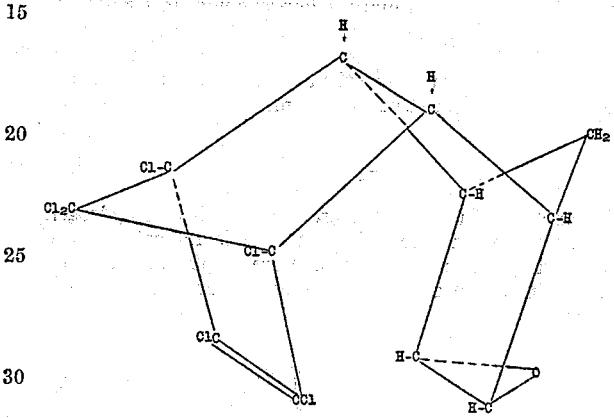

In other epoxy- and halogen-substituted octahydro-endo,-endo-dimethanonaphthalene compounds with which the invention is concerned, chlorine shown in the above formulas may be replaced by other halogens, for example bromine, and/or hydrogen shown in the formulas may be replaced by a substituent group, such as an alkyl group, an ester group, or an alkoxy group. In each case, however, there will be present the six halogen atoms on the one ring and the stereochemical configuration will be the illustrated endo-endo configuration.

When an epoxy- and halogen-substituted octahydro-endo,endo-dimethanonaphthalene compound, such as 6,7-epoxy - 1,2,3,4,10,10 - hexachloro - 1,4,4a,5,6,7,8,8a - octahydro - 1,4,5,8 - endo,endo - dimethanonaphthalene, is stored at ambient temperatures or is heated for shorter periods of time at elevated temperatures it undergoes a chemical transition which essentially destroys the valuable insecticidal activity of the compound. This transition reaction has been found to occur even though the compound is in the crystalline form and therefore of a high degree of purity.

It now has been discovered in accordance with the present invention that this chemical transition can be prevented by incorporating with the epoxy- and halogen-substituted octahydro-endo,endo-dimethanonaphthalene compound relatively small amounts of certain chemical additives and that in this manner a product of greatly improved stability can be obtained. These chemical additives which have been found to act as stabilizers for the epoxy- and halogen-substituted octahydro-endo,endo-dimethanonaphthalene compounds are relatively low molecular weight epoxy-substituted compounds wherein the epoxy group is directly substituted on vicinal carbon atoms that form part of an acyclic chain of carbon atoms.

For most effective stabilization, the epoxy-substituted stabilizer is incorporated with the solid, usually crystalline, epoxy- and halogen-substituted octahydro-endo,endo-dimethanonaphthalene compound in such a manner that it is intimately and more or less uniformly distributed throughout the bulk of the material which is to be stabilized. This can be accomplished effectively by crystallizing or precipitating the epoxy- and halogen-substituted octahydro-endo,endo-dimethanonaphthalene compound from a solution containing small amounts of the added epoxy stabilizer, thereby occluding the stabilizer within and among the solid particles of the epoxy- and halogen-substituted octahydro-endo,endo-dimethanonaphthalene.

It was surprising to discover that these epoxy-substituted or oxirane compounds which are employed as stabilizers according to the invention were capable of stabilizing the epoxy- and halogen-substituted octahydro-endo,endo-dimethanonaphthalene compounds. This was because the compounds which are being stabilized are themselves epoxy-substituted or oxirane compounds. The fact of their instability, notwithstanding that they contain the epoxy group, would not lead one to expect that a dissimilar oxirane compound added in small amounts would lead to such a marked improvement in stability as has been realized in accordance with the invention.

The epoxy-substituted compounds which are employed as stabilizers according to the invention can be represented by the generic structural formula

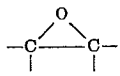

in which the three valences are each attached to hydrogen atoms or to separate univalent organic radicals. More specifically, the stabilizers which are employed according to the invention may be described by the structural formula

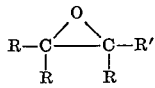

in which each R represents the hydrogen atom, an alkyl group or an aryl group, and R' represents the hydrogen atom, an alkyl group, a halogen-substituted alkyl group or an alkyl group substituted by an oxygen function such as the ether linkage (—O—) or the ester linkage (—O—CO—).

Unsubstituted epoxide compounds which can be employed according to the invention are exemplified in the simplest case by the olefin oxides, such as ethylene oxide, propylene oxide, butylene oxide, butadiene dioxide and styrene oxide. The halogen-substituted oxirane compounds which conform to the above formula are exemplified by the epihalohydrins, specifically epichlorohydrin (1,2-epoxy-3-chloropropane), epibromohydrin (1,2-epoxy-3-bromopropane), beta-methyl epichlorohydrin (1,2-epoxy-3-chloro-2-methylpropane), 1,2-epoxy-4-chlorobutane, 1,2-epoxy-5-chloropentane, 1-chloro-2,3-epoxy butane, 1,2-epoxy-3-chloro-2-phenyl propane, and homologous and analogous compounds containing both the vic-epoxy group and at least one atom of halogen (bromine or chlorine) substituted on an acyclic hydrocarbon chain.

Epoxy-substituted aliphatic compounds conforming to the above formula and containing an additional oxygen function include in particular glycidol and glycidyl ethers and glycidyl esters, e. g., the oxirane compounds conforming to the structural formula

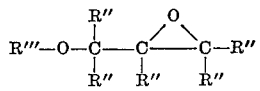

in which each R" represents the hydrogen atom or an alkyl group, preferably the hydrogen atom, and R'" represents an alkyl, aryl, alkaryl, alkoxyaryl, aryloxyaryl, aryloxyalkyl, alkoxyalkyl or acyl group. The alkyl groups may be unsubstituted alkyl groups or they may be alkyl groups substituted by epoxy oxygen. For example suitable glycidyl ethers are exemplified by diglycidyl ether as well as by the various unsubstituted glycidyl alkyl ethers, such as glycidyl ethyl ether, glycidyl propyl ether, glycidyl sec-butyl ether, glycidyl t-butyl ether, and glycidyl amyl ether. Glycidyl ethers of phenols may be employed, such as glycidyl phenyl ether, glycidyl cresyl ethers, and glycidyl tolyl ether. The glycidyl compound may contain a plurality of glycidyl units as in the glycidyl ethers of glycols or polyhydric phenols. These polyfunctional glycidyl ethers are illustrated by the diglycidyl ether of glycerine, ethylene glycol diglycidyl ether, resorcinol diglycidyl ether and diglycidyl ethers of such bisphenols as 2,2-bis(p-hydroxyphenyl)propane, 2,2-bis(p-hydroxyphenyl)butane and 1,1-bis(p-hydroxyphenyl)-ethane. The glycidyl esters which may be employed include in particular the glycidyl esters of the lower aliphatic carboxylic acids, such as glycidyl acetate, glycidyl proponate, glycidyl butyrate, glycidyl ethoxy acetate, and glycidyl caproate.

Because of its effectiveness one of the particularly preferred stabilizers is phenyl glycidyl ether. It will be appreciated, however, that the invention is not to be misconstrued as being limited to this particularly preferred agent. For example, epichlorohydrin is perhaps the most readily available of the stabilizing agents which can be employed. Another stabilizing agent which warrants particular mention is allyl glycidyl ether.

These vic-epoxy-substituted compounds which are employed as stabilizers may be incorporated with the epoxy- and halogen-substituted octahydro-endo,endo-dimethanonaphthalene compound by any suitable method to provide the novel compositions of the invention. Where the epoxy- and halogen-substituted octahydro-endo,endo-dimethanonaphthalene compound is at hand as a solid, such as a flaked product or a crystalline material, the stabilizing agent may be incorporated by dry mixing, or by blending a solution of the stabilizing agent in a volatile solvent with the solid epoxy- and halogen-substituted octahydro-endo,endo-dimethanonaphthalene compound and thereafter permitting the solvent to evaporate.

A particularly effective method, which has been employed with advantage in the preparation of stable crystalline 6,7-epoxy-1,2,3,4,10,10-hexachloro-1,4,4a,5,6,7,8,8a-octahydro-1,4,5,8-endo,endo-dimethanonaphthalene (endrin), is to add the stabilizing agent to a solution of the epoxy- and halogen-substituted octahydro-endo,endo-dimethanonaphthalene in an organic solvent for such compound and to crystallize the epoxy- and halogen-substituted octahydro-endo,endo-dimethanonaphthalene compound from the solution in the presence of the added stabilizing agent. It appears that the stabilizing agent is occluded in the crystals of the epoxy- and halogen-substituted octahydro-endo,endo-dimethanonaphthalene compound and that this occlusion may account for the remarkable stabilities which have been obtained by proceeding in this manner. The solvent may be, for example, benzene, toluene, carbon tetrachloride, iso-octane or other inert volatile organic solvent for the epoxy- and halogen-substituted octahydro-endo,endo-dimethanonaphthalene compound. The concentration of the epoxy- and halogen-substituted octahydro-endo,endo-dimethanonaphthalene compound in the solution may vary between about 10 and 60%, although these figures are not critical. The stabilizing agent is added to the solution in an amount preferably between about 0.5 and about 5%, based upon the solids content of the solution. The crystallization of the epoxy- and halogen-substituted octahydro-endo,endo-dimethanonaphthalene compound in the presence of the added stabilizing agent may be carried out by conventional methods, such as by concentrating the solution through evaporation and cooling the concentrated solution to bring about crystallization. The crystallization, of course, may be carried out either batchwise or continuously.

The amount of stabilizing agent incorporated, regardless of the method of incorporation used, generally should be within the range of from about 0.05% to about 15% by weight of the epoxy- and halogen-substituted octahydro-endo,endo-dimethanonaphthalene compound, and preferably is within the range of from about 0.5% to about 5% by weight of the epoxy- and halogen-substituted octahydro-endo,endo-dimethanonaphthalene compound. Where the epoxy- and halogen-substituted octahydro-endo,endo-dimethanonaphthalene compound to be stabilized is technical endrin, and the stabilizer is epichlorohydrin, there advantageously may be employed about 1% by weight of epichlorohydrin based upon the weight of the technical endrin. With phenyl glycidyl ether a suitable, but not limiting, amount is about 0.6%.

The stabilizing agents may be either normally liquid or normally solid, depending upon the particular compound under consideration, and may be employed in such normal form. They also may be employed in the form of solutions in water and/or an organic solvent if desired.

The novel, stable, solid (crystalline) compositions of this invention, consisting essentially of the epoxy- and halogen-substituted octahydro-endo,endo-dimethanonaphthalene compound and the stabilizing agent or stabilizing agents may be stored with notably greater safety than can the same unstabilized epoxy- and halogen-substituted octahydro-endo,endo-dimethanonaphthalene compounds in the absence of stabilizing agents. The new compositions may be employed for the preparation of insecticidal dusts, wettable powders, sprays (which may be simple solutions or may be polyphase compositions, e. g., emulsions) by methods already known for the preparation of insecticidal compositions from these epoxy- and halogen-substituted octahydro-endo,endo-dimethanonaphthalene compounds. The insecticidal compositions prepared from the novel compositions of this invention have notably increased stabilities in compounding, storage, shipment and use. The presence of the stabilizing agent has been found to exert no deleterious effect as to insecticidal or other properties.

The following examples will serve to illustrate the invention, it being understood that the examples should not be misconstrued as limiting the scope of the invention defined by the hereto appended claims.

*Example I*

To a sample of technical endrin (6,7-epoxy-1,2,3,4,10,10 - hexachloro - 1,4,4a,5,6,7,8,8a - octahydro - 1,4,5,8-endo,endo-dimethanonaphthalene) there was added about 2% by weight of epichlorohydrin. The epichlorohydrin was incorporated with the technical endrin by dissolving the latter in acetone, adding the epichlorohydrin to the acetone solution and then permitting the acetone to evaporate. A sample of the resulting solid stabilized endrin was placed in a 22 x 175 mm. glass test tube and the test tube was suspended in a constant temperature bath maintained at 75° C. To a second test tube suspended in the bath there was added a sample of solid endrin from the same lot which had been treated identically except that addition of the epichlorohydrin was omitted. With this particular preparation of technical endrin decomposition was evidenced by a rapid rise in the temperature of the sample upon or after heating to the bath temperature. Stability was measured by observing the time that elapsed between placing the sample in the bath and the onset of this rise in temperature. For the control sample 3 hours, 45 minutes elapsed. The stabilized sample remained 12 hours, 20 minutes under the conditions of this accelerated test. In terms of time, therefore, the incorporation of the epichlorohydrin increased the stability of the technical endrin by 229%.

*Example II*

A solution of technical endrin in benzene, containing about 20% by weight of technical endrin, was washed by shaking with water and the separated organic phase then was filtered through cotton to remove remaining traces of water. To a portion of the filtered solution there was added 0.6% by weight of phenyl glycidyl ether based upon the amount of endrin in the solution. The benzene then was removed by evaporation to obtain solid (crystalline) technical endrin stabilized by the phenyl glycidyl ether intimately mixed therewith.

A portion of the stabilized endrin was stored in a glass container at 100° C. The sample was analyzed periodically during the time of storage at 100° C., utilizing the absorption spectrum in the infrared to determine the content of 1,8,9,10,11,11-hexachloropentacyclo-(6.2.1.1$^{3,6}$.0$^{2,7}$.0$^{4,10}$)dodecan-5-one in the sample. This latter compound is a primary decomposition product of endrin; its concentration in the sample affords a convenient measure of the extent of decomposition of the endrin.

After 14 days storage at 100° C. the endrin stabilized by phenyl glycidyl ether was found to contain 3% by weight of 1,8,9,10,11,11-hexachloropentacyclo(6.2.1.1$^{3,6}$.0$^{2,7}$.0$^{4,10}$)dodecan-5-one.

For purposes of comparison, a second portion of solid technical endrin was prepared by the same method except that the addition of the phenyl glycidyl ether was omitted. Upon heating at 100° C. the content of 1,8,9,10,11,11-hexachloropentacyclo -(6.2.1.1$^{3,6}$.0$^{2,7}$.0$^{4,10}$)-dodecan-5-one in this unstabilized sample rose to over 70% in 48 hours.

*Example III*

The experiment described in the preceding example was repeated substituting allyl glycidyl ether for the phenyl glycidyl ether. Upon heating the stabilized endrin at 100° C. the content of 1,8,9,10,11,11 - hexa - chloropentacyclo(6.2.1.1$^{3,6}$.0$^{2,7}$.0$^{4,10}$)dodecan - 5 - one rose to 3% after 5 days heating, compared to the more than 70% content produced by 48 hours heating of the unstabilized endrin.

*Example IV*

The method of incorporation illustrated in the preceding two examples was employed with epichlorohydrin as the stabilizing agent, using a further sample of the same technical endrin that was used in the two preceding examples. Upon heating at 100° C. it required 6 days for the content of 1,8,9,10,11,11 - hexachloropentacyclo- (6.2.1.1$^{3,6}$.0$^{2,7}$.0$^{4,10}$)dodecan - 5 - one to increase its 3% by weight, compared to the content of more than 70% that resulted upon heating a control sample of the unstabilized endrin at 100° C. for 48 hours.

It will be appreciated that the invention should not be misconstrued as being limited otherwise than as indicated by the appended claims, and that the invention includes all those various specific embodiments which can be practiced by those skilled in the art in view of the disclosures without departure from the invention as defined by the appended claims.

We claim as our invention:

1. A composition of matter consisting of an epoxy- and halogen-substituted octahydro-endo,endo-dimethanonaphthalene compound and as stabilizer therefor a stabilizing minor amount of a vic-epoxy-substituted compound of the group consisting of the epoxy-alkanes and substituted epoxyalkanes having substituents chosen from the group consisting of monocyclic aryl hydrocarbon radicals, haloalkyl radicals wherein the halogen is a member of the group consisting of chlorine and bromine, hydroxyalkyl radicals, ether-substituted alkyl radicals and carboxylic acid ester-substituted alkyl radicals, which vic-epoxy compound is free from groups more reactive than said epoxy group.

2. A composition of matter defined by claim 1 wherein the epoxy- and halogen-substituted octahydro-endo,endo-dimethanonaphthalene compound is endrin.

3. A composition of matter consisting of crystalline 6,7 - epoxy - 1,2,3,4,10,10 - hexachloro - 1,4,4a,5,6,7,8,8a-octahydro - 1,4,5,8 - endo,endo - dimethanonaphthalene and as stabilizer therefor a stabilizing minor amount of haloalkyl-substituted epoxyalkane wherein the halogen is a member of the group consisting of chlorine and bromine.

4. A composition of matter consisting of crystalline 6,7 - epoxy - 1,2,3,4,10,10 - hexachloro - 1,4,4a,5,6,7,8,8a - octahydro - 1,4,5,8 - endo,endo - dimethanonaphthalene and as stabilizer therefor a stabilizing minor amount of glycidyl ether of a phenol having not more than two hydroxyl groups which is free from groups more reactive than the epoxy group.

5. A composition of matter consisting of crystalline 6,7 - epoxy - 1,2,3,4,10,10 - hexachloro - 1,4,4a,5,6,7,8,8a - octahydro - 1,4,5,8 - endo,endo - dimethanonaphthalene and as stabilizer therefor a stabilizing minor amount of phenyl glycidyl ether.

6. A composition of matter consisting of crystalline 6,7 - epoxy - 1,2,3,4,10,10 - hexachloro - 1,4,4a,5,6,7,8,8a - octahydro - 1,4,5,8 - endo,endo - dimethanonaphthalene and as stabilizer therefor a stabilizing minor amount of allyl glycidyl ether.

7. A composition of matter consisting of crystalline 6,7 - epoxy - 1,2,3,4,10,10 - hexachloro - 1,4,4a,5,6,7,8,8a - octahydro - 1,4,5,8 - endo,endo - dimethanonaphthalene and as stabilizer therefor a stabilizing minor amount of glycidyl ester of a lower aliphatic carboxylic acid which is free from groups more reactive than the epoxy group.

8. A composition of matter consisting of crystalline 6,7 - epoxy - 1,2,3,4,10,10 - hexachloro - 1,4,4a,5,6,7,8,8a - octahydro - 1,4,5,8 - endo,endo - dimethanonaphthalene and as stabilizer therefor a stabilizing minor amount of epichlorohydrin.

9. As a new composition of matter the crystalline 6,7 - epoxy - 1,2,3,4,10,10 - hexachloro - 1,4,4a,5,6,7,8,8a - octahydro-1,4,5,8-endo,endo-dimethanonaphthalene melting when pure at approximately 245° C. with decomposition and as stabilizer therefor about 1% by weight of epichlorohydrin.

10. The method of stabilizing an epoxy- and halogen-substituted octahydro - endo,endo-dimethanonaphthalene compound which comprises incorporating in said compound a stabilizing minor amount of vic-epoxy-substituted compound of the group consisting of the epoxyalkanes and substituted epoxyalkanes having substituents chosen from the group consisting of monocyclic aryl hydrocarbon radicals, haloalkyl radicals wherein the halogen is a member of the group consisting of chlorine and bromine, hydroxyalkyl radicals, ether-substituted alkyl radicals and carboxylic acid ester-substituted alkyl radicals, which vic-epoxy compound is free from groups more reactive than said epoxy group.

11. The method of stabilizing an epoxy- and halogen-substituted octahydro - endo,endo-dimethanonaphthalene compound which comprises incorporating in said compound a stabilizing minor amount of haloalkyl-substituted epoxyalkane wherein the halogen is a member of the group consisting of chlorine and bromine.

12. The method of stabilizing an epoxy- and halogen-substituted octahydro - endo,endo-dimethanonaphthalene compound which comprises incorporating in said compound a stabilizing minor amount of glycidyl ether of a phenol having not more than two hydroxyl groups which is free from groups more reactive than the epoxy group.

13. The method of stabilizing an epoxy- and halogen-substituted octahydro-endo,endo - dimethanonaphthalene compound which comprises incorporating in said compound a stabilizing minor amount of glycidyl ester of a lower aliphatic carboxylic acid which is free from groups more reactive than the epoxy group.

14. The method of stabilizing a crystalline epoxy- and halogen-substituted octahydro-endo,endo-dimethanonaphthalene compound which comprises adding to a solution of the epoxy- and halogen-substituted octahydro-endo,endo-dimethanonaphthalene compound in an organic solvent therefor a stabilizing minor amount, based upon the epoxy- and halogen-substituted octahydro-endo,endo-dimethanonaphthalene compound, of a vic-epoxy-substituted compound of the group consisting of the epoxyalkanes and substituted epoxyalkanes having substituents chosen from the group consisting of monocyclic aryl hydrocarbon radicals, haloalkyl radicals wherein the halogen is a member of the group consisting of chlorine and bromine, hydroxyalkyl radicals, ether-substituted alkyl radicals and carboxylic acid ester-substituted alkyl radicals, which vic-epoxy compound is free from groups more reactive than said epoxy group, and crystallizing the epoxy- and halogen-substituted octahydro-endo,endo-dimethanonaphthalene compound from the solution containing said added vic-epoxy-substituted compound.

15. The method defined by claim 14 in which the epoxy- and halogen-substituted octahydro-endo,endo-dimethanonaphthalene compound is endrin.

16. The method defined by claim 15 in which the added vic-epoxy-substituted compound is phenyl glycidyl ether.

17. The method defined by claim 16 in which the amount of added phenyl glycidyl ether is between about 0.1 and about 5% by weight of the endrin.

18. The method defined by claim 15 in which the added vic-epoxy-substituted compound is allyl glycidyl ether.

19. The method of stabilizing crystalline 6,7-epoxy-1,2,3,4,10,10 - hexachloro - 1,4,4a,5,6,7,8,8a - octahydro-1,4,5,8-endo,endo-dimethanonaphthalene which comprises adding to a solution of the 6,7-epoxy-1,2,3,4,10,10-hexachloro-1,4,4a,5,6,7,8,8a-octahydro - 1,4,5,8 - endo,endo-dimethanonaphthalene in an organic solvent therefor a stabilizing minor amount, based upon the 6,7-epoxy-1,2,3,-4,10,10-hexachloro - 1,4,4a,5,6,7,8,8a - octahydro-1,4,5,8-endo,endo - dimethanonaphthalene, of haloalkyl-substituted epoxyalkane wherein the halogen is a member of the group consisting of chlorine and bromine, and crystallizing 6,7,-epoxy-1,2,3,4,10,10 - hexachloro - 1,4,4a,5,6,7,8,8a-octahydro-1,4,5,8-endo,endo - dimethanonaphthalene from the solution containing said added epihalohydrin.

20. The method defined by claim 19 in which the haloalkyl-substituted epoxyalkane is epichlorohydrin and the amount of epichlorohydrin added is between about 0.1% and about 5% by weight based upon the weight of the 6,7 - epoxy - 1,2,3,4,10,10 - hexachloro - 1,4,4a, 5,6,7,8,8a - octahydro - 1,4,5,8 - endo,endo - dimethanonaphthalene.

21. As a compositon of matter an epoxy- and halogen-substituted octahydro - endo,endo-dimethanonaphthalene compound and as a stabilizer therefor from 0.05% to 15% of a vic-epoxy substituted compound of the group consisting of the epoxyalkanes and substituted epoxyalkanes having substituents chosen from the group consisting of monocyclic aryl hydrocarbon radicals, haloalkyl radicals wherein the halogen is a member of the group consisting of chlorine and bromine, hydroxyalkyl radicals, ether-substituted alkyl radicals and carboxylic acid ester-substituted alkyl radicals, which vic-epoxy compound is free from groups more reactive than said epoxy group.

22. A method of stabilizing an epoxy- and halogen-substituted octahydro-endo,endo - dimethanonaphthalene compound which comprises incorporating in said compound from 0.05% to 15% of a vic-epoxy substituted compound of the group consisting of the epoxyalkanes and substituted epoxyalkanes having substituents chosen from the group consisting of monocyclic aryl hydrocarbon radicals, haloalkyl radicals wherein the halogen is a member of the group consisting of chlorine and bromine, hydroxyalkyl radicals, ether-substituted alkyl radicals and carboxylic acid ester-substituted alkyl radicals, which vic-epoxy compound is free from groups more reactive than said epoxy group.

23. Endrin stabilized with a vic-epoxy substituted compound of the group consisting of the epoxyalkanes and substituted epoxyalkanes having substituents chosen from the group consisting of monocyclic aryl hydrocarbon radicals, haloalkyl radicals wherein the halogen is a member of the group consisting of chlorine and bromine, hydroxyalkyl radicals, ether-substituted alkyl radicals and carboxylic acid ester-substituted alkyl radicals, which vic-epoxy compound is free from groups more reactive than said epoxy group.

References Cited in the file of this patent

UNITED STATES PATENTS 2,676,132     Bluestone _____ Apr. 20, 1954

OTHER REFERENCES

Agricultural Chemicals 7:67 (September 1952).